(12) United States Patent
Kaneda et al.

(10) Patent No.: US 7,237,079 B2
(45) Date of Patent: Jun. 26, 2007

(54) DATA MIGRATION METHOD AND A DATA MIGRATION APPARATUS

(75) Inventors: Yasunori Kaneda, Sagamihara (JP); Takahiro Fujita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/239,129

(22) Filed: Sep. 30, 2005

(65) Prior Publication Data

US 2006/0026373 A1 Feb. 2, 2006

Related U.S. Application Data

(63) Continuation of application No. 10/892,275, filed on Jul. 16, 2004, now Pat. No. 7,107,421.

(30) Foreign Application Priority Data

Feb. 26, 2004 (JP) ............................. 2004-052033

(51) Int. Cl.
*G06F 12/00* (2006.01)
(52) U.S. Cl. ...................... 711/162; 711/163; 711/165; 714/7
(58) Field of Classification Search .................... None
See application file for complete search history.

(56) References Cited

U.S. PATENT DOCUMENTS

| | | | |
|---|---|---|---|
| 5,680,640 A | | 10/1997 | Ofek et al. |
| 5,835,954 A | * | 11/1998 | Duyanovich et al. ....... 711/162 |
| 5,889,935 A | | 3/1999 | Ofek et al. |
| 6,104,644 A | * | 8/2000 | Brigati .................. 365/189.07 |
| 6,681,303 B1 | | 1/2004 | Watanabe et al. |
| 6,766,430 B2 | | 7/2004 | Arakawa et al. |
| 2002/0002638 A1 | * | 1/2002 | Obara ...................... 710/11 |
| 2003/0033494 A1 | * | 2/2003 | Fujibayashi et al. ....... 711/162 |
| 2003/0037211 A1 | * | 2/2003 | Winokur .................. 711/162 |
| 2003/0212854 A1 | | 11/2003 | Kitamura et al. |
| 2005/0010609 A1 | | 1/2005 | Katoh et al. |

FOREIGN PATENT DOCUMENTS

| | | |
|---|---|---|
| JP | 03003159 A | 1/1991 |
| WO | WO 97/09676 | 3/1997 |

OTHER PUBLICATIONS

"Automating Storage and Data Resource Management with the Arkivio™ Auto-Stor Software," An Arkivio™ Technical White Paper, 2002, pp. 1-14.

* cited by examiner

*Primary Examiner*—Brian R. Peugh
(74) *Attorney, Agent, or Firm*—Antonelli, Terry, Stout & Kraus, LLP.

(57) ABSTRACT

The management computer 600 copies data in the volume 111 within the storage device 100A to the volume 115 within the storage device 100B. Upon completion of copy processing, the volume 115 is set to write protect. Then, the data in the volume 111 is read from the storage device 100A, and the data in the volume 115 is also read from the storage device 100B, to compare the two data items. Only when the data items agree with each other, setting of FC switch 400 is changed, and a target of the host computer 500 is switched from the storage device 100A to the storage device 100B. Therefore, it is possible to detect or prevent an illegal data modification in the course of data copying from the source volume to the destination volume.

4 Claims, 13 Drawing Sheets

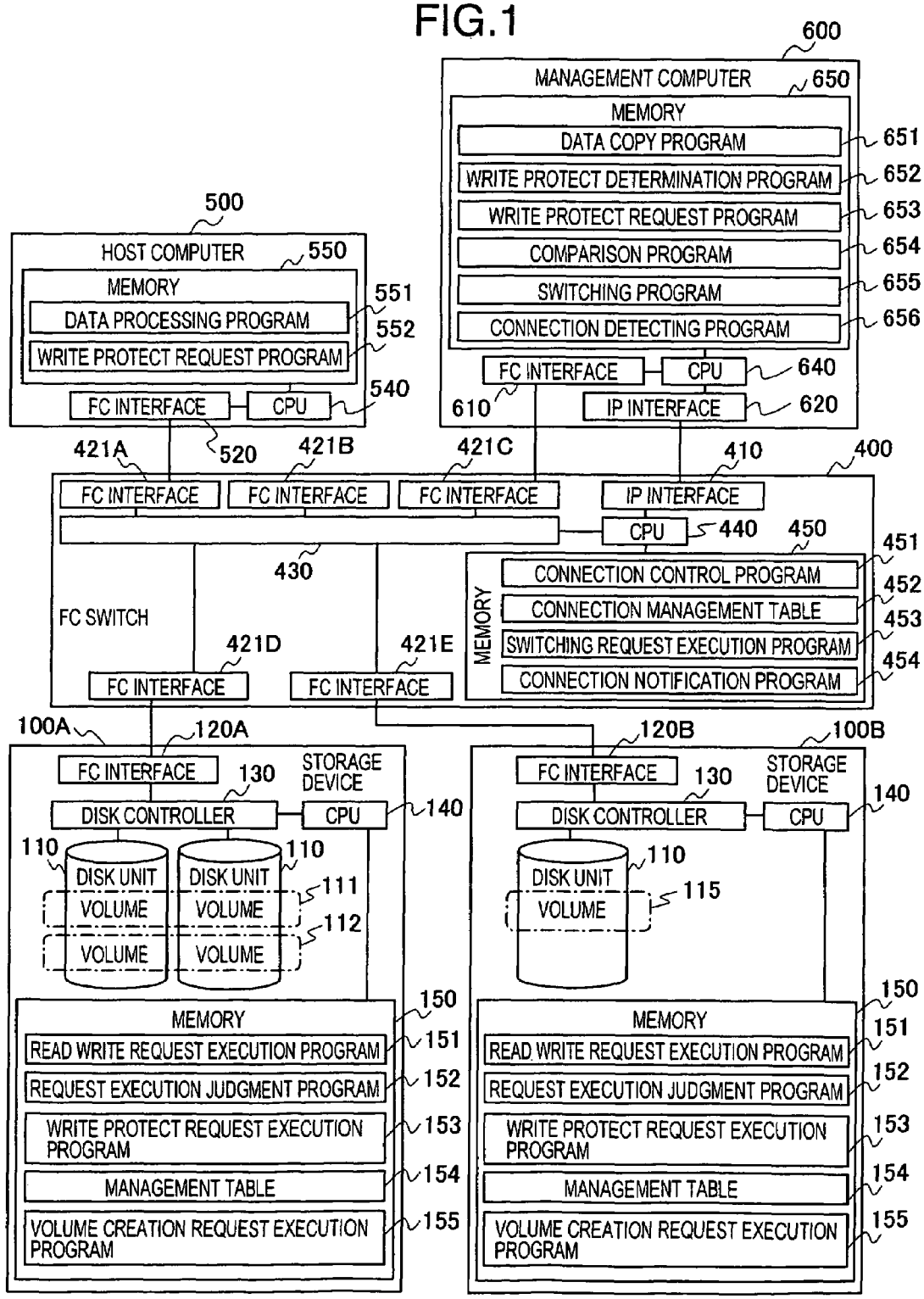

FIG.2A

MANAGEMENT TABLE 154

| VOLUME NUMBER | CAPACITY | WRITE PROPERTY | RETENTION PERIOD | LUN SECURITY | PASSWORD |
|---|---|---|---|---|---|
| 111 | 100GB | ENABLE | — | — | — |
|  |  |  | — | — | — |
|  |  |  |  |  |  |

MANAGEMENT TABLE 154

| VOLUME NUMBER | CAPACITY | WRITE PROPERTY | RETENTION PERIOD | LUN SECURITY | PASSWORD |
|---|---|---|---|---|---|
| 111 | 100GB | ENABLE | — | — | — |
| 112 | 100GB | ENABLE | — | — | — |
|  |  |  |  |  |  |

FIG.2C

MANAGEMENT TABLE 154

| VOLUME NUMBER | CAPACITY | WRITE PROPERTY | RETENTION PERIOD | LUN SECURITY | PASSWORD |
|---|---|---|---|---|---|
| 111 | 100GB | PROTECTED | 2010/12/31 | — | — |
| 112 | 100GB | ENABLE | — | — | — |
|  |  |  |  |  |  |

FIG.3A

CONNECTION MANAGEMENT TABLE 452

| AUTHORIZATION NUMBER | PACKET AUTHORIZED ROUTE (FC INTERFACE NUMBER) | | | |
|---|---|---|---|---|
| 1 | 520 | 421A | 421D | 120A |
|  |  |  |  |  |
|  |  |  |  |  |

FIG.3B

CONNECTION MANAGEMENT TABLE 452

| AUTHORIZATION NUMBER | PACKET AUTHORIZED ROUTE (FC INTERFACE NUMBER) | | | |
|---|---|---|---|---|
| 1 | 520 | 421A | 421D | 120A |
| 2 | 610 | 421C | 421D | 120A |
| 3 | 610 | 421C | 421E | 120B |

FIG.3C

CONNECTION MANAGEMENT TABLE 452

| AUTHORIZATION NUMBER | PACKET AUTHORIZED ROUTE (FC INTERFACE NUMBER) | | | |
|---|---|---|---|---|
|  |  |  |  |  |
| 1 | 520 | 421A | 421E | 120B |
|  |  |  |  |  |

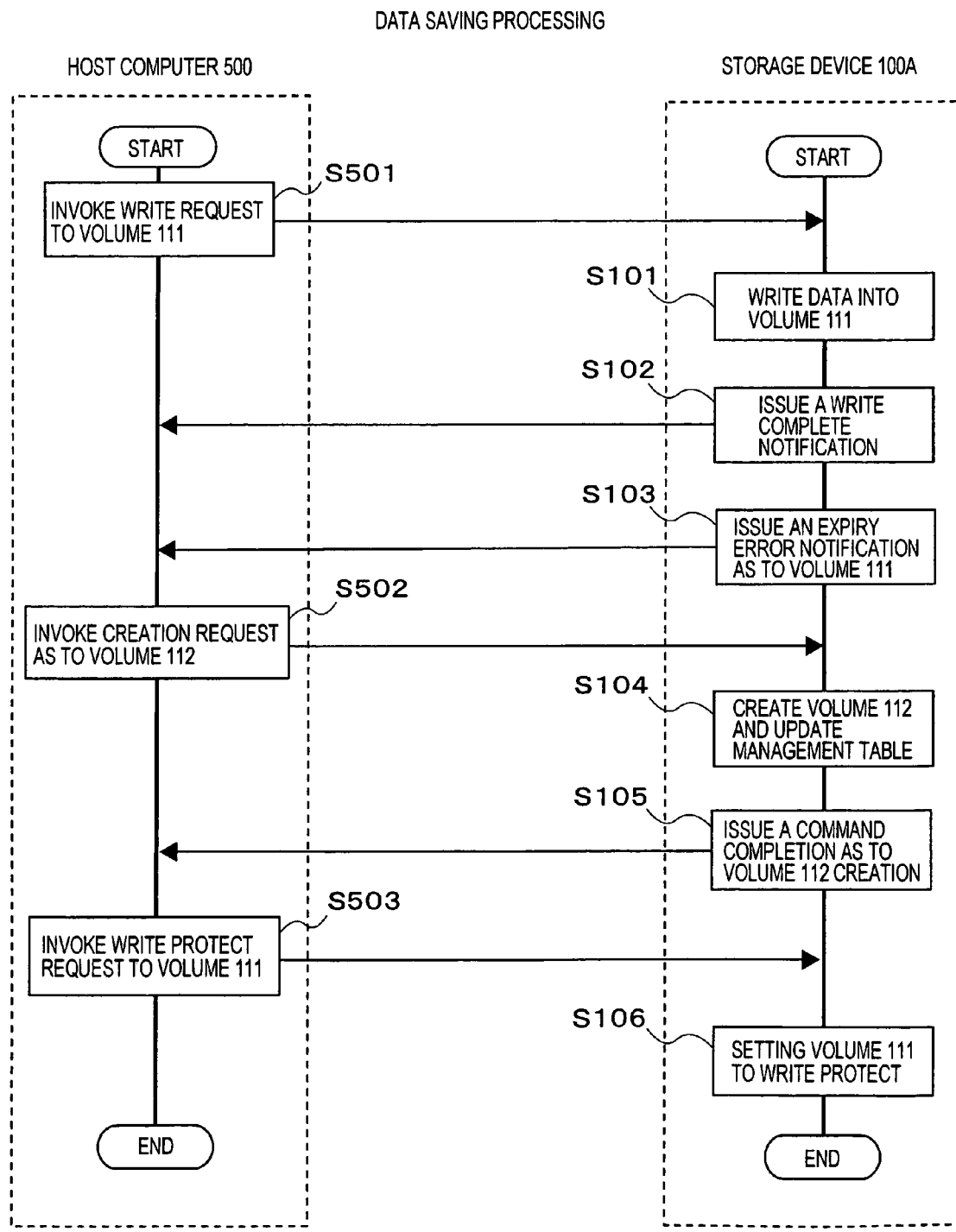

FIG.5A

WRITE PROTECT REQUEST

| REQUEST TYPE : WRITE PROTECT (5521) | VOLUME NUMBER : 111 (5522) | RETENTION PERIOD : 2010/12/31 (5523) |

FIG.5B

WRITE PROTECT REQUEST

| REQUEST TYPE : WRITE PROTECT (5521) | VOLUME NUMBER : 115 (5522) | RETENTION PERIOD : 2010/12/31 (5523) |

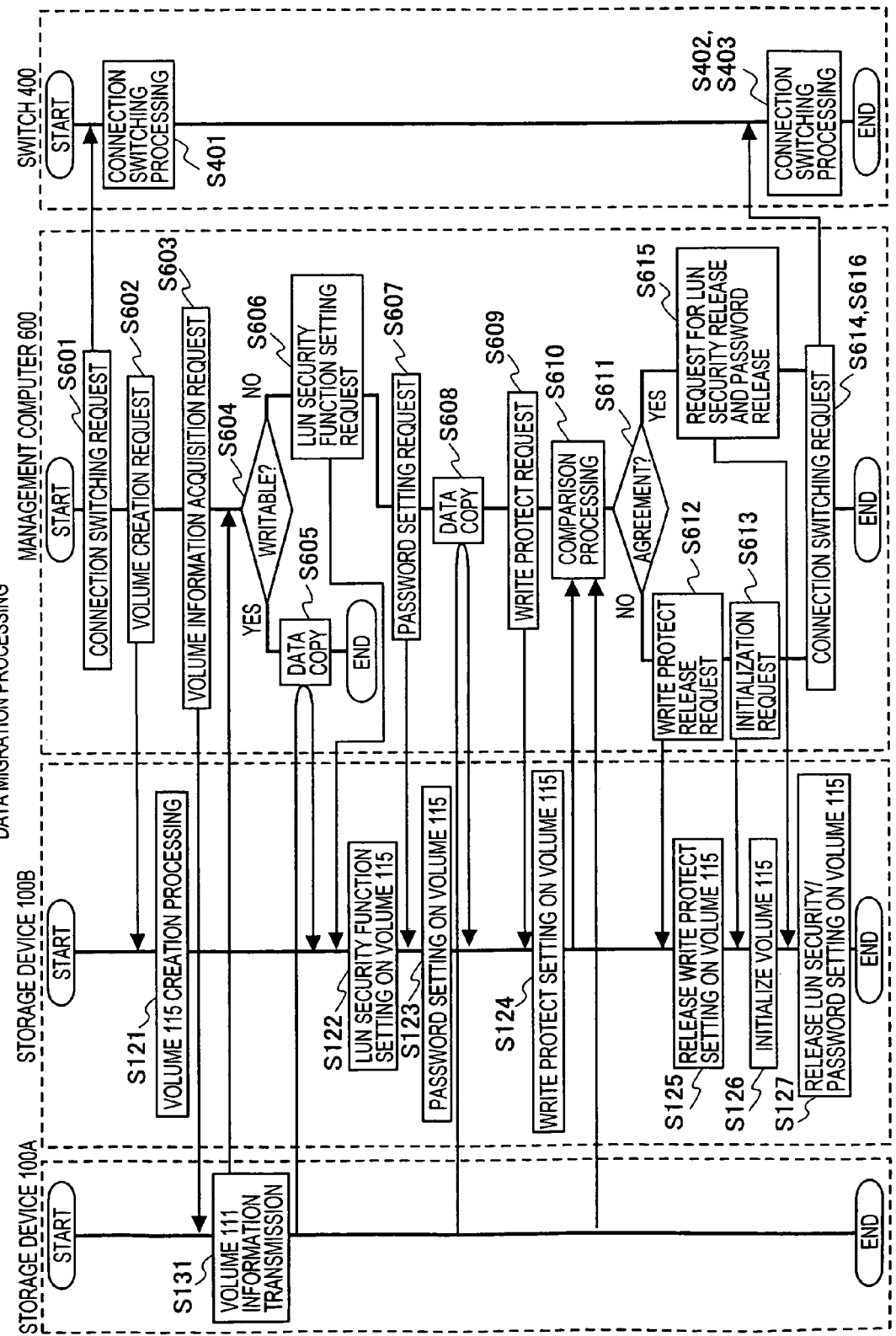

FIG.7A

CONNECTION SWITCHING REQUEST

| 6551 | 6552 | 6553 |
|---|---|---|
| REQUEST TYPE : SWITCHING | NEW AUTHORIZED ROUTE : 610,421C,421D,120A | CURRENT AUTHORIZED ROUTE : |

FIG.7B

CONNECTION SWITCHING REQUEST

| 6551 | 6552 | 6553 |
|---|---|---|
| REQUEST TYPE : SWITCHING | NEW AUTHORIZED ROUTE : 610,421C,421E,120B | CURRENT AUTHORIZED ROUTE : |

FIG.7C

CONNECTION SWITCHING REQUEST

| 6551 | 6552 | 6553 |
|---|---|---|
| REQUEST TYPE : SWITCHING | NEW AUTHORIZED ROUTE : | CURRENT AUTHORIZED ROUTE : 610,421C,421D,120A |

FIG.7D

CONNECTION SWITCHING REQUEST

| 6551 | 6552 | 6553 |
|---|---|---|
| REQUEST TYPE : SWITCHING | NEW AUTHORIZED ROUTE : | CURRENT AUTHORIZED ROUTE : 610,421C,421E,120B |

FIG.7E

CONNECTION SWITCHING REQUEST

| 6551 | 6552 | 6553 |
|---|---|---|
| REQUEST TYPE : SWITCHING | NEW AUTHORIZED ROUTE : 520,421A,421E,120B | CURRENT AUTHORIZED ROUTE : 520,421A,421D,120A |

FIG.8

VOLUME INFORMATION

| 6521 | 6522 | 6523 | 6524 |
|---|---|---|---|
| VOLUME NUMBER :111 | CAPACITY :100GB | WRITE PROPERTY : PROTECTED | RETENTION PERIOD : 2010/12/31 |

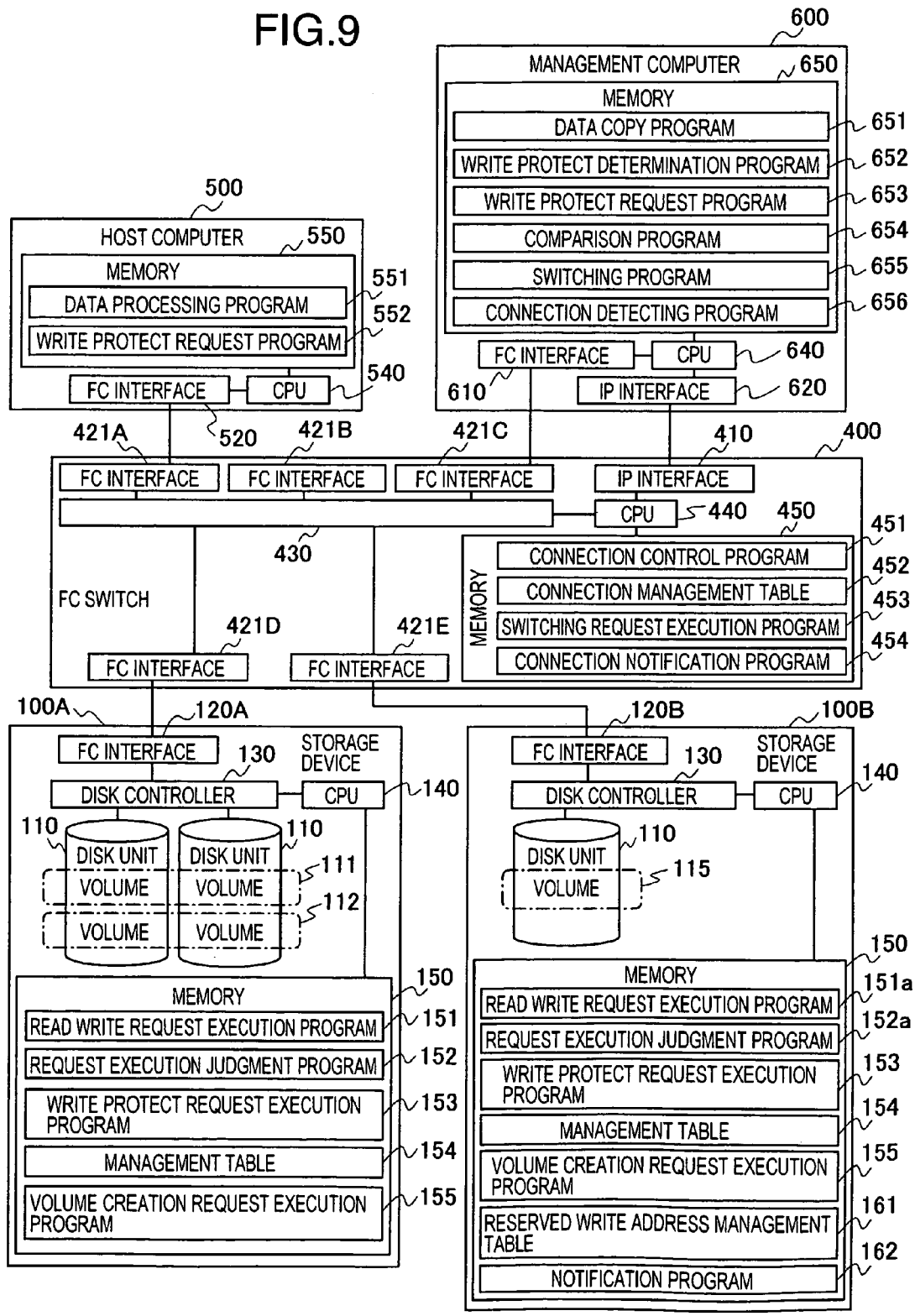

FIG.10

RESERVED WRITE ADDRESS MANAGEMENT TABLE 161

| VOLUME NUMBER | RESERVED WRITE ADDRESS |
|---|---|
| 115 | 0 |
|  |  |
|  |  |

1612 — 1613 — 1611

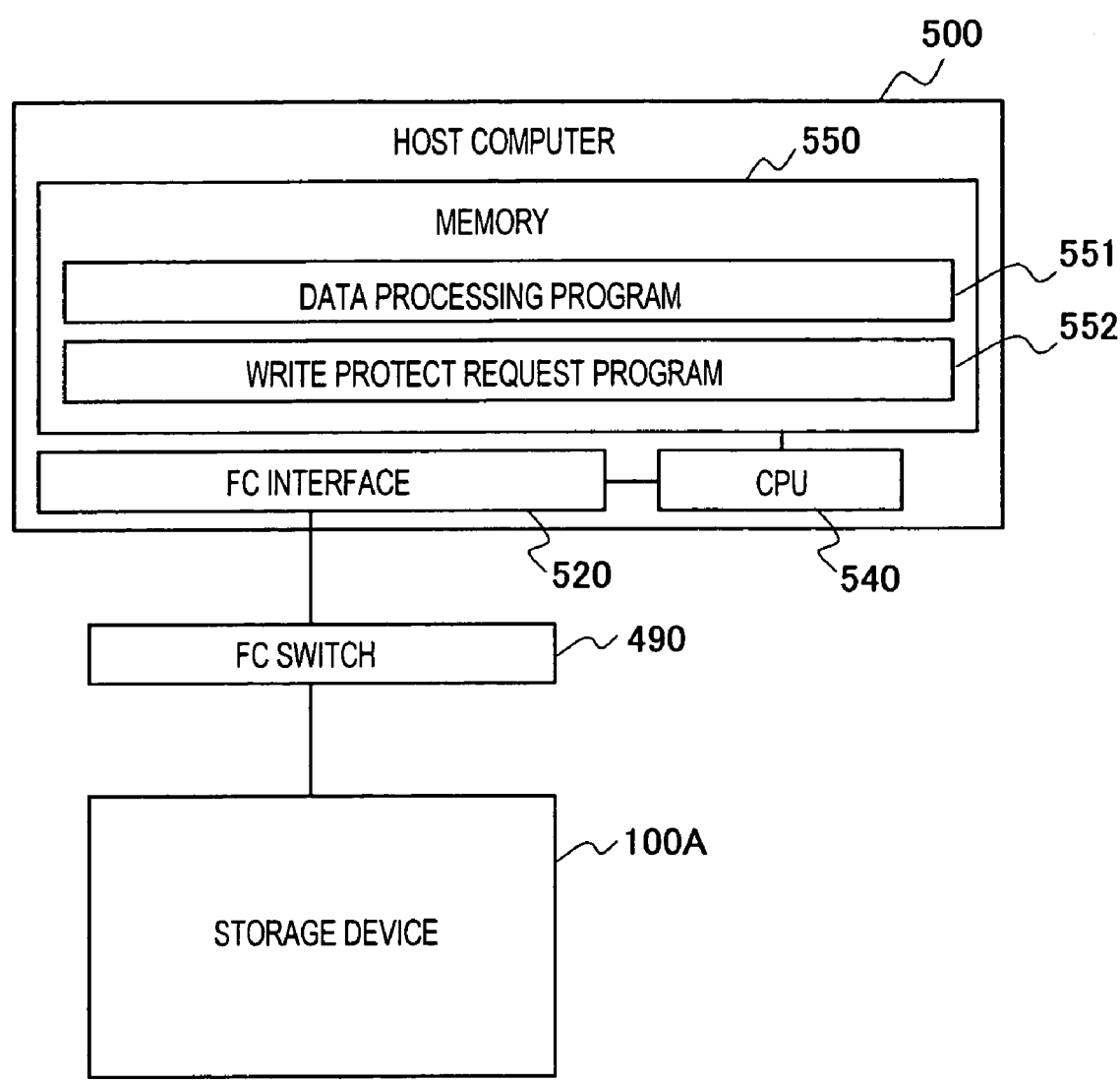

DATA MIGRATION METHOD AND A DATA MIGRATION APPARATUS

This is a Continuation of application Ser. No. 10/892,275, filed Jul. 16, 2004, now U.S. Pat. No. 7,107,421 the entire disclosures of which are hereby incorporated by reference.

This application claims a priority based on Japanese Patent Application No. 2004-052033 filed on Feb. 26, 2004, the entire contents of which are incorporated herein by reference for all purpose.

BACKGROUND

It is related with a data migration technique, and more particularly, it relates to a data protection technique against illegal modification, in the course of data moving from a storage area in a source to a storage area in a destination.

These days, documentation by a computer, utilization of database, and widespread use of the Internet increase the amount of electronic information. Such electronic information may contain valuable information which is worth to preserve for a long term. In order to preserve this kind of valuable information in a form of electronic data for 10 or 30 years, or semi-permanently, following steps are necessary. That is, as shown in FIG. 14A, by use of computer 91, electronic data stored in storage device 92 as a source is copied to storage device 93 as a destination, before the life of the storage device 92 is expired, whereby preserving the data continues, with migrations from one storage device to another across several generations (see Kohyo (National Publication of Translated Version) No. H10-508967, hereinafter referred to as "Patent Document 1").

Furthermore, in order to preserve the valuable information in a form of electronic data without illegally modified, following measures are necessary. That is, a recording medium such as CD-R or DVD-R, which is available for write once only (Write-Once Media) may be utilized. Alternatively, as shown in FIG. 14B, computer 94 stores the electronic data in storage device 95 such as hard disk, and then, sets the storage area of the electronic data to write protect. Subsequently, the electronic data is made available for read only (For example, see Japanese Patent Laid-open Publication No. H3-3159, hereinafter referred to as "Patent Document 2").

SUMMARY

According to the former conventional art (Patent document 1), it is possible to preserve electronic data for a long term, by copying the electronic data stored in the source storage device to the destination storage device. According to the latter conventional art (Patent document 2), after writing the electronic data, the storage area of the electronic data is set to write protect, whereby it is possible to prevent any illegal modification of the electronic data which is stored in the storage area. However, there is some possibility that the electronic data may be illegally modified in the course of being migrated from the source to the destination, and thereafter thus modified data may be copied to the destination. Neither of the above conventional arts takes this possibility into account.

One aspect of the present invention has been made in view of the situation above, and the object of the aspect of the present invention is to prevent or detect an illegal data modification in the course of data copying from the source to the destination.

The first aspect of the present invention to solve the above problem is directed to the following: a data migration device copies data in a source being set to write protect, to a destination. Then, the destination is set to write protect. Thereafter, the original data in the source and the copy data in the destination are read out and compared. If those two data items agree with each other, a target of the host computer is switched from the source to the destination.

For example, a data migration method according to the first aspect of the present invention is a method which carries out data migration from a first storage device to a second storage device in a computer system, comprising a host computer, the first storage device and the second storage device which provide volumes to the host computer, a switch which establishes connection among the host computer, the first storage device and the second storage device, and a data migration apparatus, wherein, the data migration apparatus executes:

a volume creation step which invokes to the second storage device, a request for creating a destination volume having a size identical to the size of a source volume that is provided by the first storage device and set to write protect, allowing the second storage device to create the destination volume;

a data copy step which carries out data copy processing which stores data corresponding to data in the source volume, into the destination volume;

a write protect step which invokes to the second storage device, a write protect request for the destination volume, and sets the destination volume to write protect, where the data in the source volume is copied;

a comparison step which reads out the data in the source volume from the first storage device and the data in the destination volume from the second storage device, and compares the two data items; and a connection switching step which invokes a connection switching request to the switch, when a result of the comparison indicates the data in the source volume agrees with the data in the destination volume, and carries out switching of a target of the host computer, from the first storage device to the second storage device.

According to the second aspect of the present invention, the data migration apparatus reads out data of a predetermined length from the source set to write protect, designates a write address determined by a total data length of data read out so far, and invokes to the destination storage device a write request as to the data. The destination data storage retains a reserved write address for new data, which is determined by a write address of already-written data, compares the reserved write address and the write address designated by the write request received from the data migration apparatus, and when two write addresses equal to each other, writes the data as a target of the write request, and then updates the reserved write address. On the other hand, when the two addresses do not equal to each other, writing of the data as a target of the write request is terminated. When the writing of the data is normally completed, the data migration apparatus reads out data subsequent to the pertinent data from the source, and repeats the processing above.

For example, a data migration method according to the second aspect of the present invention is a method which carries out data migration from a first storage device to a second storage device in a computer system, comprising a host computer, the first storage device and the second storage device which provide volumes to the host computer, a switch which establishes connection among the host computer, the first storage device and the second storage device, and a data migration apparatus, wherein, the data migration apparatus executes:

a volume creation request step which invokes to the second storage device, a request for creating a destination volume having a size identical to the size of a source volume that is provided by the first storage device and set to write protect;

a data copy step which copies the data stored in the source volume to the destination volume, by repeating a processing with respect to data in the source volume from top to bottom, under a condition that a write complete notification as to data immediately before the above data is received from the second storage device, the processing including, to read out data of a predetermined length from the source volume, calculate a write address in the destination volume on the basis of a total data length of the data read out so far from the source volume, and to invoke to the second storage device a request for writing the data together with a designation of the write address thus calculated; and a connection switching step which invokes a connection switching request to the switch and carries out switching of a target of the host computer, from the first storage device to the second storage device, and the second storage device creates the destination volume in accordance with the request for creating the destination volume received from the data migration apparatus, compares the write address designated by the request for writing the data to the destination volume, which is received from the data migration apparatus, with a reserved write address of a new data in the destination volume determined by the total data length of already-written in the destination volume, and if the two addresses equal to each other, executes the write request and issues a write complete notification to the data migration apparatus.

On the other hand, if the two addresses do not equal to each other, the second storage device does not execute the write request, issues an error notification to the data migration apparatus, and the data migration apparatus terminates the data migration processing.

According to the third aspect of the present invention, when the data migration apparatus connected to the source storage device and the destination storage device, via the switch, detects a connection of a new computer in the course of data copy processing from the source storage device to the destination storage device, the data migration apparatus terminates the data copy processing.

Other features of the present invention will be clarified with the descriptions in the specification and the attached drawings. It is noted that all three aspects of the present invention discussed above can be implemented in programs stored on a computer readable medium to allow a storage device to copy data from a source volume to a destination volume, as described above.

BRIEF DESCRIPTION OF THE DRAWINGS

FIG. 1 is a schematic diagram of a computer system to which the first embodiment of the present invention is applied.

FIGS. 2A, 2B and 2C are views for explaining registration contents examples of management table 154.

FIGS. 3A, 3B, and 3C are views for explaining registration contents example of connection management table 452.

FIG. 4 is a flow diagram for explaining data saving processing from host computer 500 to storage device 100A.

FIGS. 5A and 5B are views showing format examples of write protect request.

FIG. 6 is a flow diagram for explaining the data migration processing from storage device 100A to storage device 100B.

FIGS. 7A, 7B, 7C, 7D and 7E are views showing format examples of connection switching request.

FIG. 8 is a view showing a format example of volume information.

FIG. 9 is a schematic diagram of the computer system to which the second embodiment of the present invention is applied.

FIG. 10 is a view for explaining a registration contents example of reserved write address management table 161.

FIG. 13 is a schematic diagram of a computer system prior to applying the third embodiment of the present invention.

DESCRIPTION OF THE PREFERRED EMBODIMENT

Figure 11:
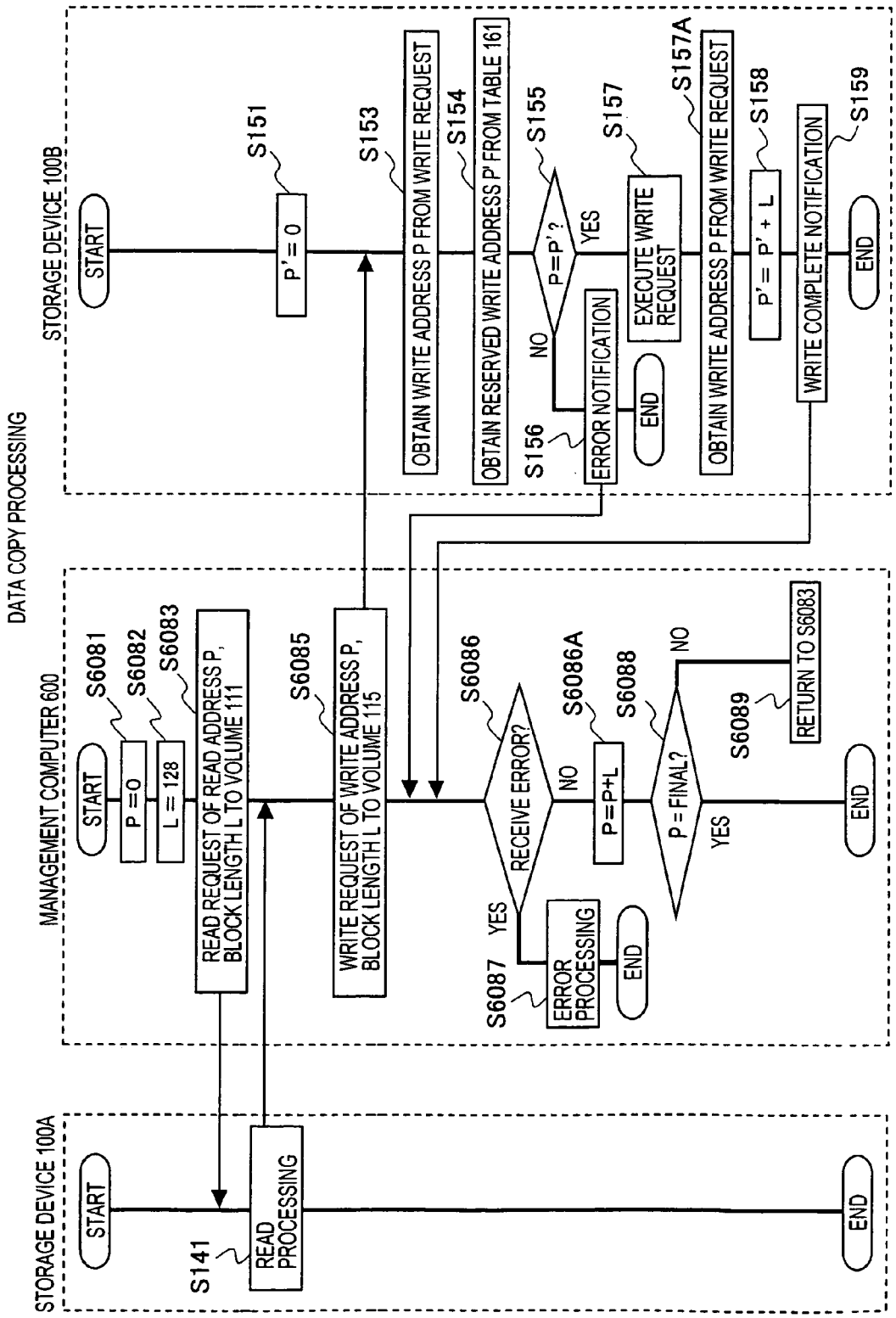
FIG. 11 is a flow diagram for explaining a data copy processing (S608 in FIG. 6) according to the second embodiment of the present invention.

Hereinafter, a computer system to which preferred embodiments of the present invention are applied will be explained.

First Embodiment

A computer system according to the first embodiment of the present invention will be explained, taking a case as an example where Storage Area Network (SAN) between a host computer and a storage device is configured by use of Fibre Channel (FC) interface. It is to be noted here that SAN is not limited to the FC interface, but it may also be configured utilizing iSCSI (Internet Small Computer System Interface).

(1) System Configuration

FIG. 1 is a schematic diagram of the computer system to which the first embodiment of the present invention is applied.

As shown in FIG. 1, the computer system of the present embodiment comprises a storage device 100A as a data migration source, a storage device 100B as a data migration destination, a management computer 600 which executes data migration between the storage devices 100A and 100B, and a host computer 500, those elements being connected via FC switch 400 constituting SAN. Here, the SAN is utilized for exchanging a request or data among the storage devices 100A, 100B (which will be referred to as "storage device 100" for ease of explanation), and the host computer 500. The management computer 600 and the FC switch 400 are connected also via IP network, and a connection notification from the FC switch 400 and a connection switching request from the management computer 600, which will be explained later, are carried out by way of this IP network.

The storage device 100 includes a CPU 140, a memory 150, a FC interface 120 (a FC interface 120A in the storage device 100A, and a FC interface 120B in the storage device 100B) for establishing connection with the FC switch 400, at least one disk unit 110, and a disk controller 130. The disk controller 130 controls data transfer processing to a volume which stores data. Here, the volume is a logical storage area constituted from at least one disk unit 110. In FIG. 1, the storage device 100A as a migration source includes two volumes 111 and 112, and the storage device 100B as a migration destination includes one volume 115.

The memory 150 stores a read write request execution (PG) program 151, a request execution judgment program 152, a write protect request execution program 153, a volume creation request execution program 155, and a management (TL) table 154.

The management table 154 is a table for managing attribute information and management information of the volume. FIGS. 2A, 2B and 2C are views for explaining registration contents examples of the management table 154. As shown in the figures, record 1541 is registered in the management table 154 by volume. The record 1541 of the volume comprises a field 1542 to register a volume number as an identifier, a field 1543 to register a capacity of the volume, a field 1544 to register a write property of the volume, and a field 1545 to register a retention period of the volume, a field 1546 to register settings of LUN (Logical Unit Number) security function, and a field 1547 to register a password to authorize accessing to the volume. Here, the LUN security function is a facility used for restricting the FC interface which is allowed to access the volume. Other exclusive function, such as IPSec may be used instead of the LUN security function. The LUN is utilized as a volume number, but for ease of explanation in the present embodiment, a reference number given to the volume is assumed as the volume number for the explanation in the following.

The CPU 140 executes the read write request execution program 151, whereby a read write request from the host computer 500 or from the management computer 600 is processed. Furthermore, the CPU 140 executes the request execution judgment program 152, and judges whether or not the read write request can be executed. The CPU 140 also executes the write protect request execution program 153 to set the volume to write protect, and executes the volume creation request execution program 155 to create a new volume.

The host computer 500 accesses the storage device 100 via the SAN, and reads and writes data stored in the storage device 100. The host computer 500 includes a CPU 540, a memory 550, and a FC interface 520 to establish connection with the FC switch 400. In addition, IP interface may also be provided to receive a processing request or data from other computer via IP network.

The memory 550 stores a data processing program 551 and a write protect request program 552. The CPU 540 executes the data processing program 551, thereby carrying out a data processing with data saving into the storage device 100. The data processing program 551 may be an application program such as an E-mail program and an electronic invoice processing program. The CPU 540 executes the write protect request program 552, thereby invoking to the storage device 100, a write protect request for the volume.

The FC switch 400 comprises a plurality of FC interfaces 421A to 421E (simply referred to as "FC interfaces 421) for establishing connection respectively with the host computer 500, the management computer 600, and the storage devices 100A, 100B, a connection switching module 430 which provides a communication facility among the plurality of FC interfaces 421, a CPU 440, a memory 450, a IP interface 410 which establishes communication with the management computer 600 via the IP network.

According to the instruction from the CPU 440, the connection switching module 430 controls from which FC interface 421 a packet is received and to which FC interface 421 the packet is issued, among the plurality of FC interfaces 421. Here, the packet is a data string in a specific format of the data or requests invoked from the computers 500, 600 or the storage device 100.

The memory 450 stores a connection control program 451, a switching request execution program 453, a connection notification program 454, and a connection management table 452. The CPU 440 executes the connection control program 451, thereby controlling the connection switching module 430, so as to control the connections among the FC interfaces 421. In addition, the CPU 440 executes the switching request execution program 453, whereby connection relationships among the FC interfaces 421 controlled by the connection control program 451 are switched according to the connection switching request from the management computer 600. The CPU 440 further executes the connection notification program 454, and when new equipment (a computer or a storage device) is connected to the FC switch 400, a connection notification is sent to the management computer 600. Here, the connection notification and the connection switching request are exchanged with the management computer 600 via the IP interface 410.

The connection management table 452 is a table for managing the connection relationships in the connection switching module 430. FIG. 3A to FIG. 3C are views for explaining registration contents examples of the connection management table 452. As shown in the figures, the connection management table 452 registers a record 4521 by authorized route (path). The record 4521 in the authorized route includes a field 4522 for registering authorization number as identifier, and a field 4523 for registering identification number of the FC interface (FC interface number) on the authorized route. In the field 4523 of the examples in the figures, there are recorded FC interface numbers on the authorized route, in the order of FC interface number of the host computer 500 or the management computer 600, FC interface number of the FC switch 400 which is connected with the host computer 500 or the management computer 600, the FC interface number of the FC switch 400 which is connected with the storage device 100, and the FC interface number of the storage device 100.

In the present embodiment, the initial state of the connection management table 452 is set as shown in FIG. 3A. Therefore, in the initial state, the CPU 440 in the FC switch 400 executes the connection control program 451, thereby referring to the connection management table 452, and controls the connection switching module 430 so that packet exchange is carried out only between the FC interface 520 of the host computer 500 and the FC interface 120A of the storage device 100A. Since the present embodiment employs FC interfaces for constructing the SAN, WWN (World Wide Name) identifier actually controls the connection switching module 430. However, for ease of explanation, a reference number given to the FC interface is assumed as FC interface number in the present embodiment.

The management computer 600 migrates the data stored in the storage device 100A as a source to the storage device 100B as a destination. The management computer 600 includes a CPU 640, a memory 650, a FC interface 620 for establishing connection with the FC switch 400, and an IP interface 620 for establishing connection with the FC switch 400 via the IP network.

The memory 650 stores, a data copy program 651, write protect determination program 652, a write protect request program 653, a comparison program 654, a switching program 655 and a connection detecting program 656. The CPU 640 executes the data copy program 651, whereby data copy between the storage devices 100 is carried out. The CPU 640 executes the write protect determination program 652, whereby write protect status of the volume is judged. Further, the CPU 640 executes the write protect request program 653, whereby a write protect request as to the volume is invoked to the storage device 100. The CPU 640 further executes the comparison program 654, and data correspondence between the volumes is compared. The CPU 640 executes the switching program 655, thereby instructing the FC switch 400 to switch the connection relationship between the host computer 500 or the management computer 600, and the storage device 100. In addition, the CPU 640 executes the connection detecting program 656, thereby suspending the data copy processing by the data copy program 651 in response to the connection notification from the FC switch 400.

(2) Data Saving Processing from the Host Computer 500 to the Storage Device 100A The data saving processing from the host computer 500 to the storage device 100A will be explained. It is to be noted, as described above, the connection management table 452 of the FC switch 400 is in a status as shown in FIG. 3A when it is in an initial state. Therefore, the host computer 500 is capable of recognizing the volume of the storage device 100A.

Here, it is assumed that only the volume 111 is created in the storage device 100A in the initial state (see FIG. 2A).

FIG. 4 is a flow diagram for explaining the data saving processing from the host computer 500 to the storage device 10A.

At first, in the host computer 500, the CPU 540 transmits a write request for the volume 111, to the storage device 100A via the FC interface 520, according to the data processing program 551 (S501). This write request is transmitted to the FC interface 120A of the storage device 100A via the FC interfaces 421A, 421D according to the connection management table 452 in the FC switch 400. On the other hand, in the storage device 100A, when the CPU 140 receives from the host computer 500 the write request for the volume 111 via the FC interface 120A, the CPU 140 writes the data to be saved into the volume 111 according to the read write request execution program 151 (S101). Then, the CPU 140 transmits a notification indicating a write completion to the host computer 500 via the FC interface 120A (S102). Here, the capacity of the volume 111 is finite (it is 100 GB in the example shown in FIG. 2A). Therefore, when the volume 111 becomes full of data, the CPU 140 in the storage device 100A transmits an error notification indicating the volume is full, to the host computer 500 via the FC interface 120A (S103).

Next, in the host computer 500, when the CPU 540 receives from the storage device 100A via the FC interface 520, the error notification indicating that the volume 111 becomes full of data, the CPU 540 invokes a volume creation request to the storage device 100A via the FC interface 520, according to the data processing program 551. This volume creation request includes a designation of a creation size of a new volume 112 to be allocated to the host computer 500 (S502). Also, according to the connection management table 452 of the FC switch 400, this volume creation request is also transmitted to the FC interface 120A of the storage device 100A via the FC interfaces 421A, 421D of the FC switch 400. On the other hand, in the storage device 100A, when the CPU 140 receives the volume creation request from the host computer 500 via the FC interface 120A, the CPU 140 creates on the disk unit 110, the volume 112 of the creation size which is designated by the request according to the volume creation request execution program 155. Then, as shown in FIG. 2B, the CPU 140 adds record 1541 of the volume 112 in the management table 154 (S104). Here, the field 1544 (write property) is set to "ENABLE", meaning writable. Then, the CPU 140 transmits a notification indicating a completion of creation, to the host computer 500 via the FC interface 120A (S105). At this timing, if the disk unit 110 does not contain enough free space to create the volume 112 of the designated creation size, the CPU 140 transmits an error notification, indicating the free space shortage, to the host computer 500.

Next, in the host computer 500, when the CPU 540 receives a creation command completion as to the volume 112 from the storage device 100A via the FC interface 520, the CPU 540 executes the write protect request program 552. Accordingly, the CPU 540 transmits a write protect request including a designation of retention period as to the volume 111 being full of data, to the storage device 100A via the FC interface 520 (S503). According to the connection management table 452 of the FC switch 400, this write protect request is also transmitted to the FC interface 120A of the storage device 100A via the FC interfaces 421A, 421D. On the other hand, in the storage device 100A, when the CPU 140 receives the write protect request for the volume 111 from the host computer 500 via the FC interface 120A, according to the write protect request execution program 153, the CPU 140 changes the setting in the field 1544 (write property) from "ENABLE" to "PROTECTED" as to the record 1541 of the volume 111 registered in the management table 154, as shown in FIG. 2C. Furthermore, the CPU 140 registers in the field 1545, a retention period which is designated in the write protect request (S106).

Subsequently, when the CPU 140 in the storage device 100A receives the write request for the volume 111 from the host computer 500 or the management computer 600, the CPU 140 refers to the management table 154 to check the write property as to the volume 111, according to the request execution judgment program 152. Since the write property is "PROTECTED", the write request for the volume 111 is not accepted, announcing that it is an error indicating the volume 111 is write-protected.

Here, a format example of the write protect request is shown in FIGS. 5A and 5B. As is shown, the write protect request includes, a request type 5521 indicating it is a write protect request, a volume number 5522 of the volume which is set to write protect, and a retention period 5523. The write protect request for the volume 111 in the flow of FIG. 4, which is invoked from the host computer 500 to the storage device 100A, is the one as shown in 5A, for example.

According to the write protect request execution program 153, the CPU 140 in the storage device 100A retains (manages) the record 1541 of the volume 111 registered in the management table 154, until the retention period registered in the field 1545 elapses. At the end of the retention period, it is possible to initialize the volume 111, and update the record 1541 of the volume 111, so that the volume 111 becomes writable again from the host computer 500.

As thus described, by setting the volume 111 to write protect, it is possible to retain the data that is created by the data processing program 551, without illegally modified. Therefore, it is highly effective when the data needs to be considered as evidence. In the above description, when the volume 111 becomes full of data, it is set to write protect, and a new volume 112 is allocated. However, it is also possible to set the volume 111 to write protect according to a time schedule, and then allocate a new volume 112.

Hereinafter, in the present embodiment, there will be explained a case where the volume 111 of the storage device 100A is set to write protect, and an administrator is required to retain the data registered in the volume 111 for a long period of time. In practice, several thousand or tens of thousands of volumes may be handled, but in any case, similar processing can be applied.

(3) Data Migration Processing from the Storage Device 100A to the Storage Device 100B

Here, it is assumed a case that the data retention period of the data stored in the volume 111 of the storage device 100A is long period of time, such as ten years or twenty years as shown in FIG. 2C. In this case, there is a possibility that the storage device 100A may come to the end of its life before the retention period of the data stored in the volume expires. Therefore, the administrator connects a new storage device 100B to the FC switch 400. Specifically, the FC interface 120B of the storage device 100B is connected to the FC interface 421E of the FC switch 400 via the FC cable. Then, the administrator instructs to the management computer 600 via an input device, not illustrated, to copy the data registered in the volume 111 of the storage 100A to the storage device 100B. Upon receipt of this data copy instruction, the data migration processing of the data in the volume 111 from the storage device 100A to the storage device 100B is started.

FIG. 6 is a flow diagram to explain the data migration processing from the storage device 100A to the storage device 10B.

At first, in the management computer 600, according to the switching program 655, the CPU 640 creates a connection switching request to be accessible to the storage device 100A as a data migration source and a connection switching request to be accessible to the storage device 100B as a data migration destination, and invokes those requests to the FC switch 400 via the IP interface 620 (S601). In FIG. 7A to 7E, there are shown format examples of the connection switching request. As shown in the figures, the connection switching request includes a request type 6551 indicating that it is a connection switching request, a new authorized route after connection switching (new authorized route) 6552, and an authorized route as a target of connection switching (current authorized route) 6553. It is to be noted that the two connection switching requests invoked in S601 are the one for adding a new authorized route allowing the management computer 600 to access the storage device 100A, and the one for adding a new authorized route allowing the management computer 600 to access the storage device 100B. Therefore, as shown in FIG. 7A and FIG. 7B, the fields of current authorized route 6553 of the two connection switching requests are null.

When the CPU 440 in the FC switch 400 receives the above two connection switching requests via the IP interface 410, according to the switching request execution program 453, the CPU 440 checks with respect to each of the two connection switching requests, whether or not the fields of the current authorized route 6553 include route information. If the route information is included, the CPU 440 searches the connection management table 452 for a record 4521 of the authorized route having the above route information registered in the field 4523, and changes the route information registered in the field 4523 of the record 4521 thus searched, to the route information stored in the new authorized route 6552 of the connection switching request. On the other hand, if the current authorized route 6553 of the connection switching request does not include any route information, the CPU 440 newly adds a record 4521 of the authorized route to the connection management table 452, and registers a unique authorization number in the field 4522 of this record. Further, the CPU 440 registers the route information stored in the new authorized route 6552 of the connection switching request in the field 4523. The above two connection switching requests invoked from the management computer 600 have the current authorized route 6553 being null, as shown in FIG. 7A and FIG. 7B. In this case, as shown in FIG. 3B, new two records 4521 of the authorized route are added to the connection management table 452, and the fields 4523 of those records are respectively registered with the route information items of the new authorized route 6553 as shown in FIG. 7A and FIG. 7B (S401). Thereafter, the CPU 440 transmits a command completion as to the connection switching processing to the management computer 600 via the IP interface 410.

Next, in the management computer 600, according to the data copy program 651, the CPU 640 invokes to the storage device 100B via the FC interface 610, a volume creation request for creating a new volume 115 as a destination of the data registered in the volume 111, designating a creation size being identical to the size of the volume 111 (S602). This volume creation request is transmitted to the FC interface 120B of the storage device 100B via the FC interfaces 421C, 421E, according to the connection management table 452 of the FC switch 400. On the other hand, in the storage device 100B, when the CPU 140 receives the volume creation request from the management computer 600 via the FC interface 120B, according to the volume creation request execution program 155, the CPU 140 creates on the disk unit 110 a volume 115 of the creation size designated by the request, and adds the record 1541 of the volume 115 into the management table 154 (S121). Here, the field 1544 (write property) is set to "ENABLE" indicating writable. Then, the CPU 140 transmits to the management computer 600 a notification indicating a creation completion via the FC interface 120B. At this timing, if the disk unit 110 does not contain enough free space to create the volume 115 of the designated creation size, the CPU 140 transmits an error notification, indicating the free space shortage, to the management computer 600.

Next, in the management computer 600, when the CPU 640 receives the error notification as to the volume creation from the storage device 100B via the FC interface 610, according to the data copy program 651, the CPU 640 displays a message denoting that volume creation is unsuccessful on a console screen not illustrated, and completes the processing. On the other hand, when the CPU 640 receives the command completion as to the volume creation from the storage device 100B, according to the write protect determination program 652, the CPU 640 invokes to the storage device 100A via the FC interface 610, a volume information acquisition request for obtaining the information of the volume 111 as a data migration source (S603). This volume information acquisition request is transmitted to the FC interface 120A of the storage device 100A via the FC interfaces 421C, 421D, according to the connection management table 452 of the FC switch 400.

In the storage device 100A, when the CPU 140 receives the volume information acquisition request from the management computer 600 via the FC interface 120A, according to the volume creation request execution program 155, the CPU 140 searches the management table 154 (see FIG. 2C) for the record 1541 of the volume 111 designated in the request, and transmits the information of the record 1541 thus searched to the management computer 600 via the FC interface 120A (S131). Consequently, it is possible for the management computer 600 to obtain the volume information as shown in FIG. 8, including the volume number 6521, a capacity 6522, a write property 6523, and a retention period 6524.

Next, in the management computer 600, if the write property of the volume information of the volume 111 received from the storage device 100A is "ENABLE" ("YES" in S604), according to the data copy program 651, the CPU 640 carries out copying the data in the volume 111 of the storage device 100A as a source, to the volume 115 of the storage device 100B as a destination (S605).

Specifically, following processes are sequentially executed with respect to each of data blocks of a predetermined data length, from the first block to the final block of the volume 111. That is, a read request for the target block is invoked to the storage device 100A via the FC interface 610. This read request is transmitted to the FC interface 120A of the storage device 100A via the FC interfaces 421C, 421D, according to the connection management table 452 of the FC switch 400. On the other hand, in the storage device 100A, when the CPU 140 receives the read request from the management computer 600 via the FC interface 120A, according to the read write request execution program 151, the CPU 140 reads out a target block designated in the request and transmits the target block to the management computer 600. Upon receipt of the target block from the storage device 100A, the management computer 600 creates a write request of the target block against the volume 115, with a write address which is determined based on the total data length from the first block to the target block, and the first address of the volume 115, and invokes thus created write request to the storage device 100B via the FC interface 610. This write request is transmitted to the FC interface 120B of the storage device 100B via the FC interfaces 421C, 421E, according to the connection management table 452 of the FC switch 400. On the other hand, in the storage device 100B, when the CPU 140 receives the write request from the management computer 600 via the FC interface 120B, according to the request execution judgment program 152, the CPU 140 refers to the management table 154 and checks the write property of the volume 115. If the write property is "ENABLE", processes the write request according to the read write request execution program 151. On the other hand, if the write property "PROTECTED", an error notification indicating the situation is issued to the management computer 600. Since the write property is "ENABLE" at the stage where the step S605 is executed, the write request is processed, and the target block is written into the volume 115.

On the other hand, in the management computer 600, when the write property of the volume information of the volume 111 received form the storage device 100A is "PROTECTED", the CPU 640 carries out the following processes so as to prevent that the data in the volume 115 as migration destination is illegally modified in the course of data copying. During the data copying process, as is obvious, the write property of the destination volume is "ENABLE". Therefore, it is preferable to find a way so as to prevent an illegal data modification in the course of data copying. Furthermore, it is also preferable to detect such a data modification if any. Hence, the following processes are executed when the write property of the volume 111 as migration source is "PROTECTED" as shown in FIG. 2C.

At first, in the management computer 600, according to the write protect request program 653, the CPU 640 invokes an LUN security function setting request to the storage device 100B via the FC interface 610 (S606). This setting request is transmitted to the storage device 100B via the FC interfaces 421C, 421E of the FC switch 400. It is to be noted that the "LUN security function" is a function utilized for restricting the FC interface which is capable of accessing the storage device. In the present example, a LUN securing function setting request to the volume 115 including the designation of FC interface number "610" is invoked to the storage device 100B, so that only the management computer 600 is capable of accessing the volume 115 of the storage device 100B.

When the CPU 140 in the storage device 100B receives the LUN security function setting request via the FC interface 120B, according to the write protect request execution program 153, the CPU 140 searches the management table 154 for the record 1541 of the volume 115 as a setting target. Then, the CPU 140 registers the FC interface number "610" which is designated in the setting request, in the field 1546 of the record 1541 thus searched (S122).

Next, in the management computer 600, according to the write protect request program 653, the CPU 640 invokes to the storage device 100B via the FC interface 610, a password setting request to the volume 115 (S607). This setting request is transmitted to the storage device 100B, via the FC interfaces 421C, 421E of the FC switch 400. It is to be noted here that the password comprises an arbitrary character string, and collation of the password is carried out at the initial stage of recognizing the volume 115. If there is a mismatch in the password, subsequent read write request to the volume 115 is prohibited.

When the CPU 140 in the storage device 100B receives the password setting request via the FC interface 120B, according to the write protect request execution program 153, the CPU 140 searches the management table 154 for the record 1541 of the volume 115 as a setting target. Then, the CPU 140 registers the password designated by the setting request into the field 1547 of the record 1541 thus searched (S123).

Then, in the management computer 600, similar to the step S605, the CPU 640 carries out copying the data in the storage device 100A as a migration source to the volume 115 of the storage device 100B as a migration destination, according to the data copy program 651. (S608).

It is to be noted here that there are settings of LUN security function and password in the volume 115 of the storage device 100B. Therefore, when the CPU 140 in the storage device 100B receives the write request to the volume 115 as to the first block of the volume 111, the CPU 140 transmits a password request to the management computer 600 which is a source of transmitting the write request, according to the request execution judgment program 152. Upon receipt of this password request, the management computer 600 returns the password set in step S607 to the storage device 100B. Then, the CPU 140 in the storage device 100B compares the password received from the management computer 600, and the password of the record 1541 of the volume 115 which is registered in the management table 154, checks whether or not the two passwords agree with each other. Then, the CPU 140 establishes a password authentication for the write request from the management computer 600 to the volume 115, only when it is confirmed that the passwords agree with each other.

Based on the premise that the password authentication has been established, the CPU 140 in the storage device 100B compares, every time when a write request to the volume 115 as to each block of the volume 111 is received, the FC interface number of the source of transmitting the write request, with the FC interface number (LUN security function) of the record 1541 of the volume 115 registered in the management table 154. Then, the CPU 140 checks whether or not those FC interface numbers agree with each other, and only when it is confirmed that those numbers agree with each other, the write request is processed. Therefore, in the present embodiment, an access other than the one from the FC interface 610 is denied.

When the data copy is completed, according to the write protect request program 653, the CPU 640 in the management computer 600 invokes a write protect request including a designation of the volume 115 as shown in FIG. 5B to the storage device 100B via the FC interface 610 (S609). Here, it is to be noted that the retention period of the volume 111 specified by the volume information of the volume 111, which is obtained from the storage device 100A, is taken over and set in the field of the retention period 5523 in the write protect request. Accordingly, the same retention period as that of the volume 111 is maintained also in the volume 115 to which the data has been migrated.

When the CPU 140 in the storage device 100B receives the write protect request for the volume 115 via the FC interface 120B, according to the write protect request execution program 153, the CPU 140 searches the management table 154 for a record 1541 of the volume 115 as a setting target. Then, the CPU 140 changes the write property of the record 1541 thus searched to "PROTECTED" (S124).

Next, according to the comparison program 654, the CPU 640 in the management computer 600 carries out a comparison processing between the data in the volume 111 and the data in the volume 115 (S610). Specifically, the CPU 640 transmits to the storage device 100A, a read request for the volume 111, and obtains the data in the volume 111 from the storage device 100A. In addition, the CPU 640 transmits to the storage device 100B, a read request for the volume 115, and obtains the data in the volume 115 from the storage device 100B. As for the volume 115, since there are settings of LUN security function and password, the password authentication and access restriction to the FC interface are carried out, similar to the write request to the volume 115 as explained in S608. However, since it is an access from the FC interface 620, the management computer 600 is capable of obtaining the data in the volume 115 from the storage device 100B.

Next, as a result of the comparison processing in S610, if the data items thus compared do not agree with each other (No in S611), the CPU 640 in the management computer 600 determines that there has been an illegal modification in the course of data copying, and carries out the following processes. At first, according to the write protect setting program 653, the CPU 640 invokes to the storage device 120B a release request against the write protect as to the volume 115 (S612). This release request is transmitted to the storage device 100B via the FC interfaces 421C, 421E of the FC switch 400. When the CPU 140 in the storage device 100B receives via the FC interface 120B, the release request against the write protect as to the volume 115, according to the write protect request execution program 153, the CPU 140 changes the write property of the record 1541 of the volume 115 to "ENABLE", the record being registered in the management table 154 (S125).

Next, the CPU 64 in the management computer 600 invokes to the storage device 120B, an initialization request for the volume 115, according to the data copy program 653 (S613). This initialization request is transmitted to the storage device 100B, via the FC interfaces 421C, 421E of the FC switch 400. When the CPU 140 in the storage device 100B receives the initialization request for the volume 115 via the FC interface 120B, the CPU 140 initializes the volume 115 according to the volume creation request execution program 155 (S126).

Then, according to the switching program 655, the CPU 640 in the management computer 600 creates a connection switching request for prohibiting the access to the storage device 100A from the management computer 600, and a connection switching request for prohibiting the access to the storage device 100B from the management computer 600, and invokes those requests to the FC switch 400 via the IP interface 620 (S614). The two connection switching requests invoked here are the one for deleting the authorized route which is used for accessing the storage device 100A from the management computer 600, and the one for deleting the authorized route which is for accessing the storage device 100B from the management computer 600. Therefore, the above two connection switching requests have the new authorized route 6553 being null, respectively as shown in FIG. 7C and FIG. 7D.

In the FC switch 400, when the CPU 440 receives the above two connection switching requests via the IP interface 410, according to the switching request execution program 453, the CPU 440 searches the connection management table 452 for the record 4521 of the authorized route having the field 4523 in which the route information of the current authorized route 6553 is registered, with respect to each of the two connection switching requests. Then, the record 4521 thus searched is deleted. Consequently, the connection management table 452 is updated from the status as shown in FIG. 3B to that in FIG. 3A (S402). Thereafter, the CPU 440 transmits a command completion as to the connection switching processing, to the management computer 600 via the IP interface 410.

Next, in the management computer 600, when the CPU 640 receives the command completion of the connection switching processing from the FC switch 400 via the IP interface 620, according to the data copy program 651, the CPU 640 displays on the console screen not illustrated, a message denoting that there is a data mismatch between the source volume and the destination volume, and then the processing is completed.

On the other hand, when the two data items agree with each other in the comparison processing in S610 (Yes in S611), the CPU 640 in the management computer 600 determines that there has been no illegal data modification in the course of data copying, and carries out the following processes. At first, according to the write protect request program 653, the CPU 640 invokes to the storage device 120B a release request against the password and LUN security function settings for the volume 115 (S615). This release request is transmitted to the storage device 100B via the FC interfaces 421C, 421E of the FC switch 400. When the CPU 140 in the storage device 100B receives via the FC interface 120B, the release request against the password and LUN security function settings for the volume 115, according to the write protect setting request execution program 153, the CPU 140 searches the management table 154 for the record 1541 of the volume 115 as a setting target. Then, the password and LUN security function settings which are registered in the record 1541 thus searched is deleted (S127).

Then, as shown in FIG. 7C to FIG. 7E, according to the switching program 655, the CPU 640 in the management computer 600 creates a connection switching request for prohibiting an access to the storage device 100A from the management computer 600, a connection switching request for prohibiting an access to the storage device 100B from the management computer 600, and a connection switching request for switching the accessing destination of the host computer 500 from the storage device 100A to the storage device 100B, and invokes those requests to the FC switch 400 via the IP interface 620 (S616).

In the FC switch 400, when the CPU 440 receives the connection switching requests as shown in FIG. 7C to FIG. 7E via the IP interface 410, according to the switching request execution program 453, the CPU 440 searches the connection management table 452 for a record 4521 of the authorized route with the field 4523 where the route information of the current authorized route 6553 in the connection switching request is registered, with respect to each of the connection switching requests. Then, the CPU 440 deletes the records 4521 corresponding to the connection switching requests of FIGS. 7C, D, and changes the route information registered in the field 4523 of the record 4521 corresponding to the connection switching request of FIG. 7E to the route information stored in the new authorized route 6552 in the connection switching request. Consequently, the connection management table 452 is updated from the status of FIG. 3B to the status of FIG. 3C (S403). Afterwards, the CPU 440 transmits to the management computer 600 via the IP interface 410, a command completion as to the connection switching processing. Accordingly, the host computer 500 is allowed to utilize the volume 115 in the storage device 100B, instead of the volume 111 in the storage device 100A.

According to the processing as described above, it is possible to guarantee that the data in the volume 115 has not been illegally modified in the course of migration, and it is further possible to configure such that illegal modification during data copying is hardly carried out with the LUN security function setting and password setting.

(4) Effect Against Illegal Access

Here, an explanation will be made on the assumption that data is illegally modified in the course of data copying. The illegal data modification is carried out when there is a writing of some kind into the volume 115 in the storage device 100B during the data copy. In the present embodiment, the following operations are necessary to carry out some kind of writing into the volume 115 in the storage device 100B during the data copy.

Operation 1: Rewrite the connection management table 452 in the FC switch 400

Operation 2: Establish connection to the FC switch 400 from a computer for carrying out illegal accessing.

Operation 3: Obtain the password

Operation 4: Data write disguised as WWN, to break through the LUN security

First of all, since the WWN can exist based on the premise that it is unique in the world, any operations cannot be anticipated in the case where multiple identical WWNs exist within one FC switch. Further, writing into the volume 115 is possible only when all the above four operations 1 to 4 are successfully executed. In other words, since LUN security function and password settings are applied in the present embodiment, illegal data modification is made more difficult comparing to the case where such functions are not applied. Even if there should be a writing into the volume 115 after execution of the above four operations 1 to 4, it is possible to detect the illegal modification by making the volume 115 (migration destination) as write protected, and thereafter comparing the data in the volume 115 with the data in the volume 111 (migration source). Therefore, the target will never be changed from the volume 111 to the volume 115 if it is illegally modified. In other words, the host computer 500 will never use the illegally modified volume 115 erroneously.

In the present embodiment, the memory 450 in the FC switch 400 stores the connection notification program 454, and also the memory 650 in the management computer 600 stores the connection detecting program 656. The CPU 440 in the FC switch 400 executes the connection notification program 454 and carries out the next processing. That is, the CPU 440 monitors a connection status of the FC interfaces 421. Upon detecting that a new computer is connected to any of the FC interfaces 421, the CPU 440 issues a connection notification to the management computer 600 via the IP interface 410. On the other hand, the CPU 640 in the management computer 600 executes the connection detecting program 656 and carries out the following processing. In other words, upon receipt of the connection notification from the FC switch 400 via the IP interface 620, the CPU 640 suspends the above data migration processing (see FIG. 6) if it is in progress at the timing, and informs an administrator of the status. Then, the CPU 640 receives an instruction from the administrator whether or not the processing is to be continued, and continues the processing only when it receives an instruction to continue the processing. With this configuration, it is possible for the administrator to check the connection status of the FC switch 400, and determines whether or not the processing is to be continued. That is, immediately after detecting a possibility of illegal modification, the data migration processing is suspended, and thus it is possible to prevent any damage due to the modification from occurring.

Second Embodiment

Next, the second embodiment of the present invention will be explained.

In the first embodiment, after the data copy from the volume 111 as a source to the volume 115 as a destination is completed and the destination volume 115 is set to write protect, the data in the volume 111 and the data in the volume 115 are compared to detect an illegal data modification. In the second embodiment, it is configured such that an illegal data modification can be detected in the course of data copying from the source volume 111 to the destination volume 115.

(1) System Configuration

FIG. 9 is a schematic diagram of a computer system to which the second embodiment of the present invention has been applied. As shown in the FIG. 9, the computer system of the present embodiment is different from that of the first embodiment as shown in FIG. 1 in the points as the following: The memory 150 of the storage device 100B stores read write request execution program 151*a* and request execution judgment program 152*a* instead of the read write request execution program 151 and the request execution judgment program 152. The memory 150 of the storage device 100B stores additionally, a reserved write address management table 161 and a notification program 162. Other parts of the configuration are the same as those of the first embodiment.

When write requests are continuously invoked by the data copy processing, the reserved write address management table 161 holds a reserved write address of data to be written by the subsequent write request. FIG. 10 is a view for explaining a registration contents example of the reserved write address management table 161. As shown in FIG. 10, the reserved write address management table 161 registers a record 1611 by volume which is a data copy destination. The record 1611 of the volume includes a field 1612 for registering a volume number as identifier and a field 1613 for registering a reserved write address. Here, the reserved write address indicates an address where a data block is to be written, in the case where the data block is written in the target volume. This reserved write address can be obtained by adding a total data length of the data blocks written in the target volume so far, to the first address of the target volume.

(2) Data Copy Processing

Operations of the present embodiment are basically the same as those of the first embodiment as shown in FIG. 1. However, in the present embodiment, illegal data modification can be detected in the course of data copying from the source volume 111 to the destination volume 115. Therefore, data copy processing in the case where the write property of the source volume 111 is set to "PROTECTED" (S608 in FIG. 6) is different from that of the first embodiment.

FIG. 11 is a flow diagram for explaining the data copy processing (S608 of FIG. 6) according to the second embodiment of the present invention.

In the management computer 600, according to the data copy program 651, the CPU 640 carries out the following processes: At first, write (read) address P is set to the initial address "zero" (S6081). Block length L of the target data block of the write (read) request is set to a predetermined value (128 blocks, for example) (S6082). Next, a read request for the volume 111 having the read address P and the block length L is invoked to the storage device 100A via the FC interface 610 (S6083). According to the connection management table 452 of the FC switch 400 this read request is transmitted to the FC interface 120A of the storage device 100A via the FC interfaces 421C, 421D.

On the other hand, in the storage device 100A, when the CPU 140 receives the read request from the management computer 600 via the FC interface 120A, according to the read write request execution program 151, the CPU 140 reads out the data block with the block length L from the read address P of the volume 111, and transmits the data block to the management computer 600 (S141).

Next, in the management computer 600, when the CPU 640 receives the data block from the storage device 100A, the CPU 640 invokes a write request for the volume 115 as to the data block thus received having the write address P and block length L, to the storage device 100B via the FC interface 610 (S6085). According to the connection management table 452 of the FC switch 400 this write request is transmitted to the FC interface 120B of the storage device 100B via the FC interfaces 421C, 421E.

In the meantime, when the volume 115 is created in the storage device 100B, according to the request execution judgment program 152a, the CPU 140 adds a record 1611 of the volume 115 to the reserved write address management table 161, and sets the reserved write address P' of the record 1611 as initial value "zero" (S151). Thereafter, when the CPU 140 receives the write request from the management computer 600 via the FC interface 120B, according to the request execution judgment program 152a, the CPU 140 obtains the write address P from the write request thus received (S153). The CPU 140 further obtains the reserved write address P' from the record 1611 of the volume 115 in the reserved write address management table 161 (S154).

Then, the CPU 140 checks whether or not the write address P agrees with the write address P' (S155).

When those write addresses do not equal to each other (No in S155), there is a possibility that the target data block of the write request has been illegally modified during when it is transmitted from the management computer 600 to the storage device 100B. In such a case above, the CPU 140 of the storage device 100B executes the notification program 162, and transmits to the management computer 600 an error notification indicating that the target data block of the write request has been illegally modified (S156). On the other hand, when the write address P agrees with the write address P' (Yes in S155), the CPU 140 of the storage device 100B executes the write request according to the read write request execution program 151a (S157). Thereafter, the CPU 140 obtains the block length L from the write request (S157A), adds the block length L to the reserved write address P', and updates the reserved write address P' (S158). Then, the CPU 140 transmits a write complete notification to the management computer 600 (S159).

In the meantime, when the CPU 640 receives the error notification from the storage device 100B (YES in S6086), the CPU 640 displays an error message and the like on a console screen not illustrated, and completes the data copy processing (S6087). On the other hand, when the CPU 640 receives the write complete notification from the storage device 100B, the CPU 640 adds the block length L to the write (read) address P, and updates the write address P (S6086A). Then, it is determined whether or not the write (read) address P is positioned in the final block of the volume 111 (S6088). If it is not positioned in the final block, processing is returned to S6083 (S6089). On the other hand, if it is positioned in the final block, the data copy processing is completed.

(3) Acceleration of Illegal Data Modification Detection

According to the second embodiment, a person who tries to carry out an illegal access is forced to invoke a write request with a designation of the "reserved write address", which changes every moment on the storage device 100B side in the course of data copying. Therefore, illegal modification (invoking an illegal write request) is extremely difficult. In the first embodiment of the present invention, such data modification cannot be detected until the data copy is completed, but in the second embodiment, it can be detected during the data copy processing. It is to be noted that the modification detection processing after the data copy completion is carried out in the second embodiment as well. However, this processing can be omitted. In this case, comparison processing after the data copy completion is not necessary. Further, write protect setting after the data copy completion is not necessary either. When copying is completed up to the final block, the "reserved write address" of the reserved write address management table 161 becomes the final block address, and further writing is not allowed. That is, it is effective to the degree equivalent to the write protect setting. Furthermore, since it is possible to assure that there has not been any illegal access at the time of data copy completion, data migration processing time can be shortened comparing to the first embodiment.

Third Embodiment

Next, the third embodiment of the present invention will be explained.

In the first embodiment and the second embodiment above, the storage device 100, FC switch 400 and management computer 600 are provided in a separated manner. On the other hand, in the third embodiment, those elements are integrally provided. Though the system configuration is distinctly different, processing procedures for data migration are similar to those of the first and the second embodiments.

(1) System Configuration

Figure 12:
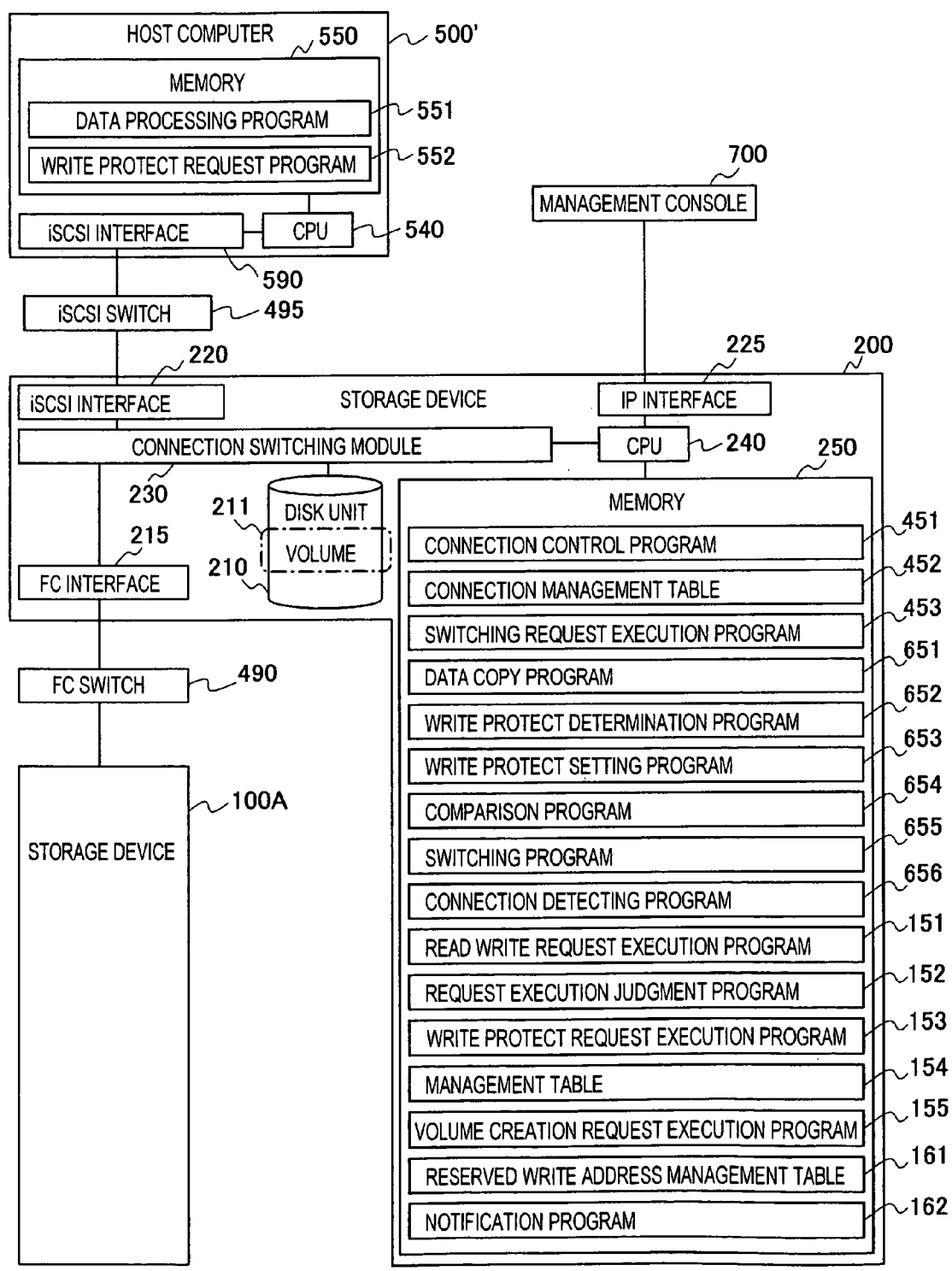
FIG. 12 is a schematic diagram of the computer system to which the third embodiment of the present invention is applied.
Figure 14A:
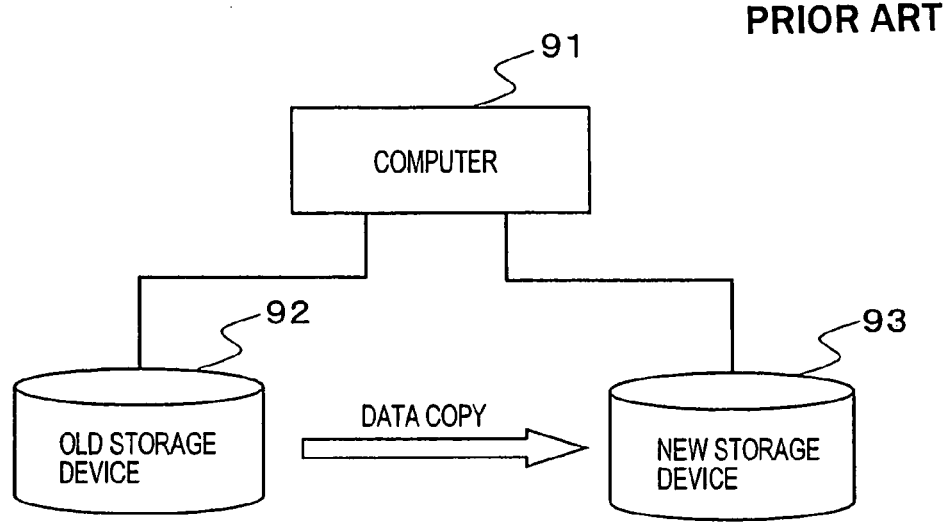
FIGS. 14A and 14B are diagrams for explaining a conventional data migration technique and a protection technique against illegal data modification.
Figure 14B:
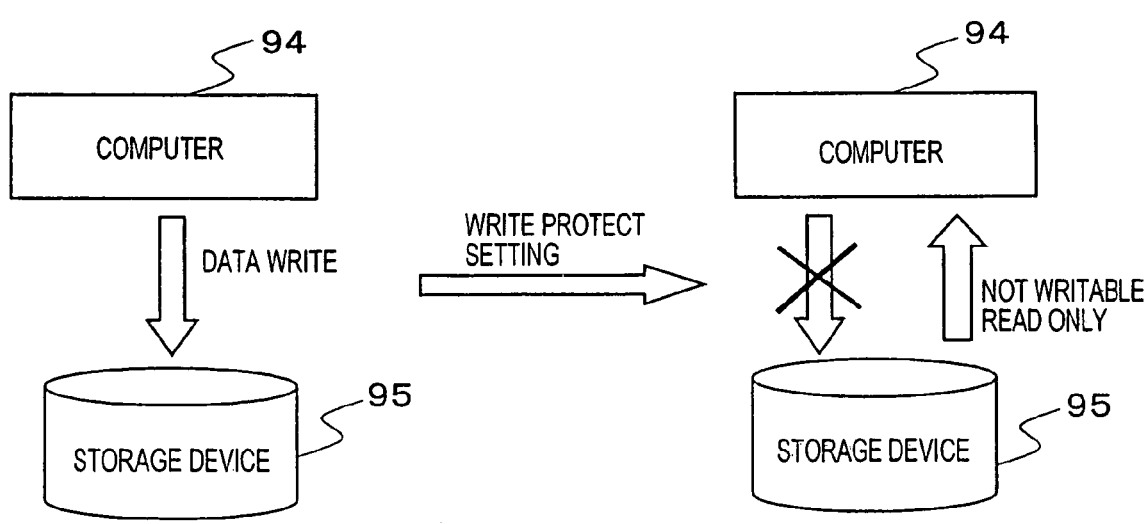

FIG. 12 is a schematic diagram of the computer system to which the third embodiment of the present invention has been applied. It is to be noted that corresponding elements are labeled the same in the first embodiment as shown in FIG. 1 and the third embodiment as shown in FIG. 12.

As is shown, the computer system of the present embodiment comprises a storage device 100A as a data migration source, a storage device 200 as a data migration destination, a host computer 500', a FC switch 490, and an iSCSI switch 495. The storage device 100A and the storage device 200 are connected by the FC switch 490 via the FC interface. The storage device 200 and the host computer 500' are connected by the iSCSI switch 495 via the iSCSI interface. It is to be noted that the connection between the storage device 100A and the storage device 200, and the connection between the storage device 200 and the host computer 500' do not depend on a specific interface, similar to the case of the first embodiment. It is further possible to directly connect the storage device 100A and the storage device 200 without going through the FC switch 490. By directly connecting the storage device 100A and the storage device 200, it is possible to inhibit a connection of a computer which carries out an illegal access. When the FC switch 490 is provided, similar to the FC switch 400 in the first embodiment as shown in FIG. 1, it is possible to allow the CPU in the FC switch 490 to execute the connection notification program 454 which detects a connection of a computer, and notifies the storage device 200 of the connection.

After the following steps, the computer system of the present embodiment as shown in FIG. 12 is implemented: In a general computer system as shown in FIG. 13 (a system where the host computer 500 as shown in FIG. 1 and the storage device 100A are mutually connected via the normal FC switch 490), the storage device 100A has come to the end of its device life, and a new storage device 200 is purchased, and then it is added into the computer system. The storage device 200 of the present embodiment comprises both the FC interface and the iSCSI interface. Here, in order to change the configuration from the one as shown in FIG. 13 to the one as shown in FIG. 12, the host computer 500 and the storage device 100 are once disconnected. Furthermore, the host computer 500 is changed to host computer 500' by changing the interface from the FC interface 520 to the iSCSI interface 590. Then, the storage device 200 is connected to the storage device 100A via the FC switch 490, and also it is connected to the host computer 500' via a normal iSCSI switch 495. In the configuration as shown in FIG. 12, a management console 700 is provided, and it is connected to the storage device 200 via the IP network. The management console 700 is utilized for instructing an execution of programs stored in the storage device 200, and for displaying logs and results of the execution of those programs.

The storage computer 200 provides functions as the storage device 100B, the FC switch 400, and the management computer 600 as shown in the second embodiment of the present invention. As shown in FIG. 12, the storage computer 200 comprises, a disk unit 210, at least one FC interface 215 for establishing connection with the FC switch 490, at least one iSCSI interface 220 for establishing connection with the iSCSI switch 495, an IP interface 225 for carrying out communication with the management console 700 via the IP network, a connection switching module 230, a CPU 240, and a memory 250.

The connection switching module 230 provides a communication facility between the FC interface 215 and the iSCSI interface 220. It further provides a facility as a disk controller. In other words, according to an instruction from the CPU 240, the connection switching module 230 controls between the FC interface 215 and the iSCSI interface 220, from which interface a packet is received and to which interface the packet is issued. Further, according to the instruction from the CPU 240, the connection switching module 230 controls data transfer processing to the volume 211 configured on the disk unit 210, as to the data which is sent to/received from the host computer 500' via the iSCSI interface 220.

The memory 250 stores, a connection control program 451, a connection management table 452 and a switching request execution program 453 which are stored in the memory 450 of the FC switch 400 as shown in FIG. 1, a data copy program 651, a write protect determination program 652, a write protect request program 653, a comparison program 654, a switching program 655, and a connection detecting program 656 which are stored in the memory 650 of the management computer 600 as shown in FIG. 1, and a read write request execution program 151, a request execution judgment program 152, a write protect request execution program 153, a management table 154, a volume creation request execution program 155, a reserved write address management program 161, and a notification program 162 which are stored in the storage device 100B as shown in FIG. 9.

(2) Data Migration Processing from the Storage Device 100A to the Storage Device 200

Data migration processing from the storage device 100A to the storage device 200 is the same as that of the first embodiment and the second embodiment. However, inputting an instruction from an administrator or information presentation to the administrator is carried out by the function provided in the storage device 200, serving as the management computer 600, which utilizes the management console 700 as I/O device.

In the present embodiment, the computer system is configured so that the first path (iSCSI interface) for connecting the host computer 500' and the storage device 200 and the second path (FC interface) for connecting the storage device 200 and the storage device 100A are separately provided. Further, the storage device 200 is provided with a facility serving as the management computer 600. Therefore, data copy processing is carried out only in the second path. Therefore, in order to illegally modify the data, it is necessary to establish connection to the second path, and to invoke a write request. Therefore, the computer system is configured so that the second path serves as a dedicated path to connect the storage devices only, and it is physically separated from the first path which is connected to the computer. For example, the second path may be installed only in a locked room. This configuration will make the illegal access more difficult.

In the present embodiment, the storage device 200 utilizes iSCSI interface for the interface with the host computer 500', and FC interface for the interface with the storage device 100A. However, the present invention is not limited to this configuration. It is possible to use another type of interface. Furthermore, the same interface may be used for the interfaces between the host computer 500 and the storage device 200, and between the storage device 100A and the storage device 200.

According to the above specified embodiments of the present invention, when the data in the source agrees with the data in the destination, the target of the host computer is switched from the source to the destination. Alternatively, only when the write address of the data read out from the source is positioned properly, the data is written in the destination. Further alternatively, when a new computer is connected during data copy processing from the source to the destination, the data copy processing is suspended. Therefore, it is possible to detect or prevent an illegal data modification in the course of data copying from the source volume to the destination volume.

What is claimed:

1. A data migration method which carries out data migration from a first storage device to a second storage device in a computer system, comprising a host computer, said first storage device and said second storage device which provide volumes to said host computer, a switch which establishes connection among said host computer, said first storage device and said second storage device, and a data migration apparatus, wherein, said data method comprising the steps of:
(a) providing to said second storage device, a request for creating a destination volume having a size identical to the size of a source volume that is provided by said first storage device;
(b) carrying out a data copy processing which copies the data stored in said source volume, which data is comprised of a plurality of data blocks each having a predetermined data length, to said destination volume, by repeating a processing with respect to data in said source volume from top to bottom so that all of the data in the source volume is copied to the destination volume one data block at a time until all of the plurality of data blocks comprising said data stored in said source volume are copied to said destination volume, under a condition that a write complete notification as to data immediately before said data is received from said second storage device, said processing including, to read out data of a predetermined length from said source volume, calculate a write address in said destination volume on the basis of a total data length of the data read out so far from said source volume, and to provide to said second storage device a request for writing the data together with a designation of the write address thus calculated; and
(c) providing a connection switching request to said switch and carrying out switching of a target of said host computer, from said first storage device to said second storage device, and
wherein said second storage device performs the steps of:
(d) creating said destination volume in accordance with the request for creating said destination volume received from said data migration apparatus,
(e) comparing the write address designated by the request for writing the data to said destination volume, which is received from said data migration apparatus, with a reserved write address of a new data in said destination volume determined by the total data length of data already-written in said destination volume, and
(f) executing the write request and issuing a write complete notification to said data migration apparatus if the two addresses equal to each other, and
(g) repeating steps (e) and (f) until all of the data blocks comprising the data of the source volume have been copied to the destination volume.

2. A data migration method according to claim 1, wherein, if the two addresses do not equal to each other as a result of comparison, said second storage device does not execute the write request and issues an error notification to said data migration apparatus, and said data migration apparatus terminates said data copy processing.

3. A storage device to which data in a source volume, which data is comprised of a plurality of data blocks each having a predetermined data length, is copied by a data migration apparatus so that all of the data in the source volume is copied to the destination volume one data block at a time until all of the plurality of data blocks comprising said data stored in said source volume are copied to said destination volume, comprising:

volume creation unit which creates a destination volume having a size identical to said source volume, according to a volume creation request received from said data migration apparatus, and a write request processing unit which compares a write address designated by a write request for writing the data to said destination volume, which is received from said data migration apparatus, with a reserved write address of a new data to said destination volume determined by a total data length of data already-written in said destination volume, and if the two addresses equal to each other, executes the write request and issues a write complete notification to said data migration apparatus, and if the two addresses do not equal to each other, issues an error notification to said data migration apparatus without executing the write request, wherein the write request processing unit repeats comparing the write address, executing the write request and issuing a write complete notification for each data block, one block at a time, until the plurality of data blocks which comprise the data stored in the source volume have been copied to the destination volume, unless an error notification is issued.

4. A computer readable recording medium which stores a program allowing a storage device to copy data in a source volume to a destination volume, which data is comprised of a plurality of data blocks each having a predetermined data length, according to an instruction from a data migration apparatus, so that all of the data in the source volume is copied to the destination volume one data block at a time until all of the plurality of data blocks comprising said data stored in said source volume are copied to said destination volume, wherein, said program comprises:

code that creates the destination volume having a size identical to said source volume, according to a volume creation request received from said data migration apparatus, and code that compares a write address designated by a request for writing the data to said destination volume, which is received from said data migration apparatus, with a reserved write address of a new data to said destination volume determined by a total data length of data already-written in said destination volume, and if the two addresses equal to each other, executes the write request and issues a write complete notification to said data migration apparatus, and if the two addresses do not equal to each other, issues an error notification to said data migration apparatus without executing the write request, wherein the code repeats comparing the write address, executing the write request and issuing a write complete notification for each data block, one block at a time, until the plurality of data blocks which comprise the source volume have been copied to the destination volume, unless an error notification is issued.

* * * * *